United States Patent
Li et al.

(10) Patent No.: US 10,936,487 B2
(45) Date of Patent: Mar. 2, 2021

(54) METHODS AND APPARATUS FOR USING CIRCULAR ADDRESSING IN CONVOLUTIONAL OPERATION

(71) Applicant: Beijing Horizon Information Technology Co., Ltd., Beijing (CN)

(72) Inventors: Delin Li, Beijing (CN); Zhenjiang Wang, Beijing (CN); Wenhui Cao, Beijing (CN); Kun Lin, Beijing (CN); Liang Chen, Beijing (CN); Jianjun Li, Beijing (CN); Chang Huang, Beijing (CN)

(*) Notice: Subject to any disclaimer, the term of this patent is extended or adjusted under 35 U.S.C. 154(b) by 0 days.

(21) Appl. No.: 15/919,207

(22) Filed: Mar. 12, 2018

(65) Prior Publication Data

US 2019/0278707 A1    Sep. 12, 2019

(51) Int. Cl.
    G06F 12/06    (2006.01)
(52) U.S. Cl.
    CPC .. G06F 12/0646 (2013.01); *G06F 2212/1008* (2013.01)
(58) Field of Classification Search
    None
    See application file for complete search history.

(56) References Cited

U.S. PATENT DOCUMENTS

| | | | |
|---|---|---|---|
| 4,722,067 A * | 1/1988 | Williams | G06F 5/10 708/491 |
| 4,742,479 A * | 5/1988 | Kloker | G06F 7/72 708/491 |
| 4,800,524 A * | 1/1989 | Roesgen | G06F 5/10 711/217 |
| 4,967,200 A * | 10/1990 | Arambepola | G01S 13/9011 342/189 |
| 5,249,148 A * | 9/1993 | Catherwood | G06F 5/10 708/491 |
| 6,314,507 B1 * | 11/2001 | Doyle | G06F 9/355 708/708 |
| 6,397,318 B1 * | 5/2002 | Peh | G06F 5/10 711/217 |
| 6,604,169 B2 * | 8/2003 | Catherwood | G06F 7/72 711/110 |
| 6,785,798 B2 * | 8/2004 | Chou | G06F 5/10 711/110 |
| 7,475,221 B1 * | 1/2009 | Metzgen | G06F 5/10 711/110 |
| 9,654,134 B2 * | 5/2017 | Popovich | H03M 1/188 |

(Continued)

OTHER PUBLICATIONS

Steve Arar, "Circular Buffer: A Critical Element of Digital Signal Processors", Nov. 13, 2017, pp. 1-13, https://www.allaboutcircuits.com/technical-articles/circular-buffer-a-critical-element-of-digital-signal-processors/ (Year: 2017).*

(Continued)

*Primary Examiner* — Christopher D Birkhimer

(57) ABSTRACT

A method and apparatus are disclosed to perform the circular addressing to emulate a virtually unlimited memory space despite the fixed capacity of a physical memory by readdressing the portion of the data that exceeds the pre-defined length of the circular addressing region to another pre-defined address in the circular addressing region. Data segments in a data sample can be loaded and computed with recalculated circular addresses for different applications.

20 Claims, 8 Drawing Sheets

(56) References Cited

U.S. PATENT DOCUMENTS

| | | | | |
|---|---|---|---|---|
| 2002/0194452 A1* | 12/2002 | Catherwood | ............ | G06F 7/72 |
| | | | | 711/220 |
| 2003/0033499 A1* | 2/2003 | Chou | ........................ | G06F 5/10 |
| | | | | 711/220 |
| 2014/0280752 A1* | 9/2014 | Seastrom | ............ | H04L 67/1002 |
| | | | | 709/219 |

OTHER PUBLICATIONS

Anonymous, "Lecture 13", Mar. 29, 2017, pp. 1-8, https://web.archive.org/web/20170329041237/http://www.navodayaengg.in/wp-content/uploads/2015/09/U2_L13_Special-Addressing-Modes.pdf (Year: 2017).*

Dipa Rao, "Circular Buffering on TMS320C6000", Apr. 2001, pp. 1-17, http://www.ti.com/lit/an/spra645a/spra645a.pdf (Year: 2001).*

Anonymous, "Modulo Addressing", Nov. 13, 2017, pp. 1-3, https://web.archive.org/web/20171113155124/https://microchipdeveloper.com/dsp0201:modulo-addressing (Year: 2014).*

* cited by examiner

METHODS AND APPARATUS FOR USING CIRCULAR ADDRESSING IN CONVOLUTIONAL OPERATION

BACKGROUND OF THE INVENTION

This invention generally relates to memory addressing, and more specifically, to a method and an apparatus for using circular memory addressing in applications such as machine-learning-based applications using convolutional neural networks to reduce memory access bandwidth.

The fast and constant advancement in convolutional neural network (CNN) leads to an increasing number of CNN-based applications, such as object recognition, tracking, and classification. Most of CNN-based (or other model-based) applications not only require performance of high accuracy, but also are sensitive to the energy or power consumption as well as the cost. Power consumption and cost considerations are particularly important for embedded devices with a small form factor, limited memory space and battery supply, such as smartphone, tablets, and other mobile handheld devices. One way to reduce the cost and power consumption of running applications on such embedded devices is reducing the size and capacity of the Static Random-Access Memory (SRAM) on these devices. But in order to maintain the accuracy of pre-trained convolutional neural network models (and other models) for machine learning applications running on these devices, the input image (or video) need to have a relatively high resolution, which requires a relatively large memory size for storage/processing, and could not be buffered in the SRAM of these embedded devices at one time. With reduced SRAM size and capacity, one full input image or video frame need to be segmented (or sliced) into several sub-regions (or sub-blocks), which can be either overlapping with each other or non-overlapping, depending on the application and implementation. Each segment or slice can be buffered in the SRAM completely and processed independently with computing of associated CNN models (or corresponding neural network weights). Processing one full high-resolution image or video frame thus can be fulfilled by processing its sub-regions consecutively using the limited SRAM.

As known in the art, an example of applying convolutional operations to images is done by multiplying the input image, which has a total of three matrices of pixels—one matrix each for the red, blue and green color channels with each pixel consisting of an integer value between 0 and 255 in each color channel, with the convolution kernel—a series of corresponding matrices of point numbers where the pattern and the size of the numbers can be thought of as a recipe for how to intertwine the input image with the kernel in the convolution operation. The output of the kernel is the altered image which is often called a feature map in deep learning. For example, a 2D convolutional kernel is often represented as a N×N template (N can be 3, 5, or other integers). The numbers of a N×N convolutional kernel represent the associated model weight. The N×N convolutional kernels overlap at the boundaries of neighboring sub-regions. The boundary image pixels from the last sub-region have to be buffered for processing the current sub-region. These boundary pixels can be cached into SRAM, but iterative caching of these boundary pixels would waste the memory access bandwidth associated with the frequent random access.

Also, after segmentation of a full image or video frame and before computation of any of its sub-regions or segments including performing N×N convolutional operation on the pixels, the entire data of one segment has to be cached into a continuous memory space with consecutive addresses. Because of the limit memory space on the embedded devices (such as SRAM), it is often the case that the data required for processing the next segment cannot fit into the remaining memory space following storage of the data of the last segment and has to be addressed somewhere else-making the boundary data within the last segment unavailable to computation of the next segment. Thus, the next segment has to be loaded to a new address together with the overlapping boundary data for computation.

One example of this duplicative loading of boundary data is illustrated in FIG. 1. As shown in FIG. 1(a), the exemplary SRAM has 480 KB of capacity. A full set of data of 544K bytes is divided into four consecutive segments of 160 KB each (with 32 KB overlapping between successive segments). Computing the entire data set is accordingly divided into four sub-computing processes of these consecutive segments. Computing segment 1 requires data from 0 to 160 KB, while the portion between 128 KB and 160 KB—the 32 KB boundary data-overlaps with the data of segment 2 starting 128 KB and ending 288 KB. Likewise, the overlapping portion between segments 2 and 3, starting 256 KB ending 288 KB is required for computing segment 3. For the sub-computing processes of segments 1-3, the associated data (e.g., image pixels, or feature map elements) from 0 KB to 416 KB can be buffered completely, continuously and consecutively in the SRAM having a size of 480 KB. But the data required for computing the fourth segment, i.e. from 384 KB to 580 KB, cannot be cached consecutively following segment 3, because including the fourth segment, a total of 544 KB, would exceed the total capacity of the SRAM—480 KB—as shown in FIG. 1(a). Because the fourth segment cannot be loaded into the remaining memory space following segment 3, the overlapping boundary data within segment 3 (from 384 KB to 416 KB) cannot be reused for computing the fourth segment. The entire 160 KB data including the boundary data ranging from 384 KB to 416 KB required for computing the fourth segment has to be cached elsewhere, for example by overriding the data occupied by the first sub-computing process addressed 0 KB to 160 KB as shown in FIG. 1(b). As a result, the portion of data starting 384 KB ending 416 KB is cached twice—once for segment 3 and once for segment 4, wasting limited memory resources. Thus there is an unresolved problem to avoid duplicative loading of boundary data and to improve usage of limited memory on embedded devices.

BRIEF SUMMARY

According to one embodiment of the present invention, circular addressing instructions are provided using hardware modules (such as an address generator) to emulate a virtually unlimited memory space despite the fixed capacity of a physical memory (such as a SRAM on an embedded device) by readdressing the portion of the data that exceeds the pre-defined length of the circular buffer to the beginning of the circular buffer. Thus, duplicative caching of overlapping boundary data in neighboring data segments is avoided and the memory access bandwidth in applications, such as applications using convolutional operations, is reduced.

According to another embodiment of the present invention, in combination of the hardware instructions to enable circular addressing, additional instructions can be provided using software modules to load and compute segments of the data with recalculated circular addresses.

According to a further aspect of the present invention, the length of a particular circular buffer can be pre-defined, for example as a portion of the total SRAM size. Thus, an SRAM can be used as multiple circular buffers, which can have different lengths. These circular buffers of different lengths can be configured to cache data segments of different types or sizes to ensure continuous storage of different data sets, reduce the conflicts incurred by manually allocating different data sets and fragmentation of the memory space.

Specifically, in one embodiment, a method for performing circular addressing is provided. A circular addressing region is first defined in a memory system, wherein the circular addressing region has an upper boundary with an address $A_x$ and a lower boundary with an address $A_y$. A data sample is divided into more than one consecutive data segments, wherein more than one consecutive data segments include segments $D_0$ to $D_n$, wherein n is greater than 1. An instruction set for execution is provided, which is configured to compute an address $A_i$ wherein the data segment $D_i$ is stored in the circular address region starting from the address $A_i$. The data segment $D_i$ has a length of L comprising a first portion with a length of $L_1$ and a second portion with a length $L_2$, wherein the first portion of the data segment $D_i$ overlaps with the data segment $D_{i-1}$, wherein i is greater than 0, and is less than or is equal to n. The instruction set is then executed to compute the address $A_i$ based on an address $A_{i-1}$, wherein the data segment $D_{i-1}$ is stored in the circular address region starting from the address $A_{i-1}$; wherein the address $A_i$ is computed as $A_x+(A_{i-1}-A_x+L_2)$ % $(A_y-A_x+1)$; wherein % indicates a modulo operation that finds the remainder after division of $(A_{i-1}-A_x+L_2)$ by $(A_y-A_x+1)$. The data segment $D_i$ is then stored starting at the address $A_i$.

In another embodiment, a method for performing circular addressing is provided. A circular addressing region in a memory system is first defined. The width of circular addressing region is divided into one or more slices including $Slice_{\_a}$ to $Slice_{\_b}$ and the available width of the circular addressing region is defined as $(Slice_{\_a}-Slice_{\_b}+1)$. The depth of circular addressing region is defined to have an upper boundary with an address as $Offset_{\_x}$ and a lower boundary with an address as $Offset_{\_y}$, and the available depth of the circular addressing region is defined as $(Offset_{\_y}-Offset_{\_x}+1)$. A data sample is divided into more than one consecutive data segments, wherein more than one consecutive data segments include segments $D_0$ to $D_n$, wherein n is greater than 0. An instruction set is then provided for execution, wherein the instruction set is configured to compute $(Slice_{\_i}, Offset_{\_j})$ for data segment $D_i$, wherein the data segment $D_i$ is stored in in $Slice_{\_i}$ starting from the address $Offset_{\_j}$ in the circular addressing region, wherein the data segment $D_i$ has a length of L comprising a first portion with a length of $L_1$ and a second portion with a length $L_2$, wherein the first portion of the data segment $D_i$ overlaps with the data segment $D_{i-1}$, wherein i is equal or greater than 0, and is less than or is equal to n. The instruction set is then executed to compute $(Slice_{\_i}, Offset_{\_j})$ for data segment $D_i$ based on $(Slice_{\_i-1}, Offset_{\_j-1})$, wherein data segment $D_{i-1}$ is stored in in $Slice_{\_i-1}$ starting from the address $Offset_{\_j-1}$ in the circular addressing region; wherein $Offset_{\_j}$ is computed as $Offset_{\_x}+(Offset_{\_j-1}-Offset_{\_x}+L)$ % $(Offset_{\_y}-Offset_{\_x}+1)$; wherein the address $Slice_{\_i}$ is computed as $Slice_{\_a}+(Slice_{\_i-1}-Slice_{\_a}+(Offset_{\_j-1}-Offset_{\_x}+L)/(Offset_{\_y}-Offset_{\_x}+1))$% $(Slice_{\_b}-Slice_{\_a}+1)$; wherein % indicates a modulo operation that finds the remainder after division of one by another. The data segment $D_i$ is then stored in $Slice_{\_i}$ in width, starting at the $Offset_{\_j}$ in depth.

In another embodiment, an apparatus for performing circular addressing is provided. The apparatus comprises an integrated circuit device, wherein the integrated circuit comprising a data memory and a processor core. The processor core further comprises a circular address generator, wherein the circular address generator is configured to perform data memory addressing and access in said data memory. Said data memory including one or more circular addressing region, wherein the width of one circular addressing region is divided into one or more slices including $Slice_{\_a}$ to $Slice_{\_b}$ and the available width of said circular addressing region is defined as $(Slice_{\_a}-Slice_{\_b}+1)$, wherein n is equal or greater than 0; wherein the depth of said circular addressing region has an upper boundary with an address as $Offset_{\_x}$ and a lower boundary with an address as $Offset_{\_y}$, and the available depth of the circular addressing region is defined as $(Offset_{\_y}-Offset_{\_x}+1)$. The circular address generator comprised in the process core is configured to execute an instruction set to compute $(Slice_{\_i}, Offset_{\_j})$ for a data segment $D_i$ with a length of L, wherein the data segment $D_i$ is one data segment comprised in more than one consecutive data segments including segments $D_0$ to $D_n$, wherein n is equal or greater than 0 and wherein i is equal or greater than 0, and is less than or is equal to n; wherein the data segment $D_i$ is stored in in $Slice_{\_i}$ starting from the address $Offset_{\_j}$ in said circular addressing region. The circular address generator is configured to compute $(Slice_{\_i}, Offset_{\_j})$ for data segment $D_i$ based on $(Slice_{\_i-1}, Offset_{\_j-1})$, wherein data segment $D_{i-1}$ is stored in in $Slice_{\_i-1}$ starting from the address $Offset_{\_j-1}$ in the circular addressing region; wherein $Offset_{\_j}$ is computed as $Offset_{\_x}+(Offset_{\_j-1}-Offset_{\_x}+L)$ % $(Offset_{\_y}-Offset_{\_x}+1)$; wherein the address $Slice_{\_i}$ is computed as $Slice_{\_a}+(Slice_{\_i-1}-Slice_{\_a}+(Offset_{\_j-1}-Offset_{\_x}+L)/(Offset_{\_y}-Offset_{\_x}+1))$% $(Slice_{\_b}-Slice_{\_a}+1)$; wherein % indicates a modulo operation that finds the remainder after division of one by another. The processor core is further configured to store data segment $D_i$ in $Slice_{\_i}$ in the circular addressing region, starting at the $Offset_{\_j}$ in depth.

DETAILED DESCRIPTION

The present principles are directed to memory circular addressing and may be used in applications, such as applications using convolutional operations in machine learning, to reduce the memory access bandwidth by avoiding duplicative caching of overlapping boundary data in neighboring data segments. The following discusses various embodiments in the context of CNN-based applications. However, the present embodiments can be adapted to other machine learning models and theorems, and may also be applied to other types of applications on the embedded devices such as image filtering including de-noising, de-blocking, de-blurring etc.

Figure 1A:
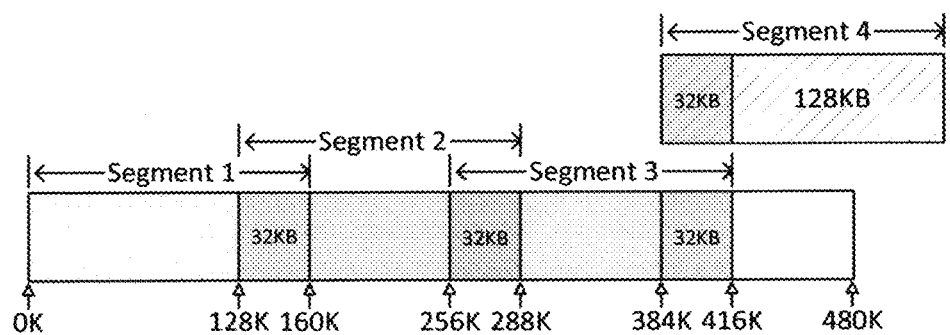
FIGS. 1(a) and 1(b) are diagrams illustrating caching and addressing the four segments of 544 KB data in a 480 KB SRAM in prior art.
Figure 1B:
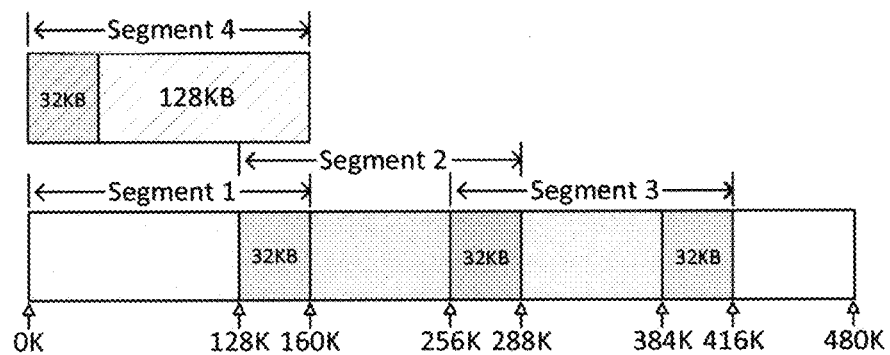
Figure 2A:
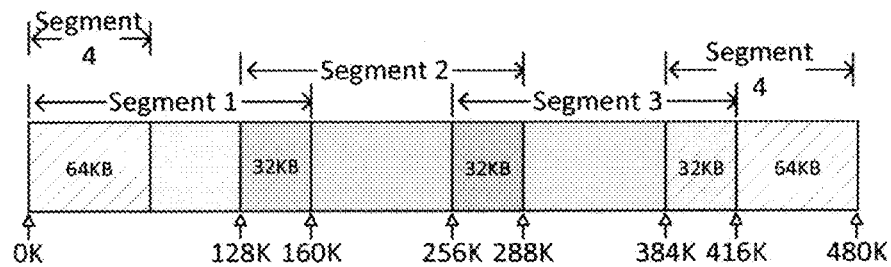
FIGS. 2(a), 2(b) and 2(c) are diagrams illustrating an embodiment of the present invention using circular buffer to cache and address the four segments of 544 KB data in a 480 KB SRAM.
Figure 2B:
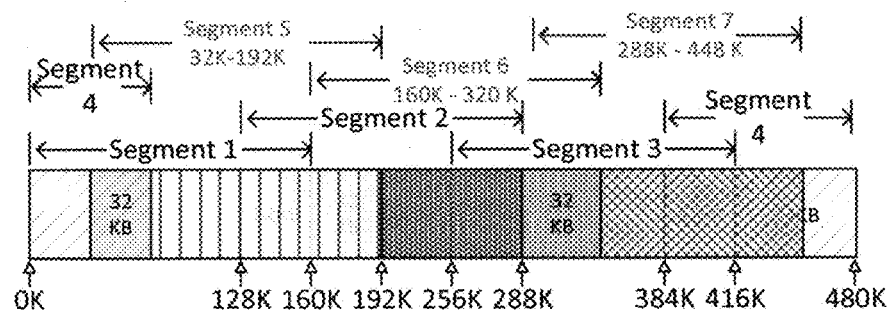
Figure 2C:
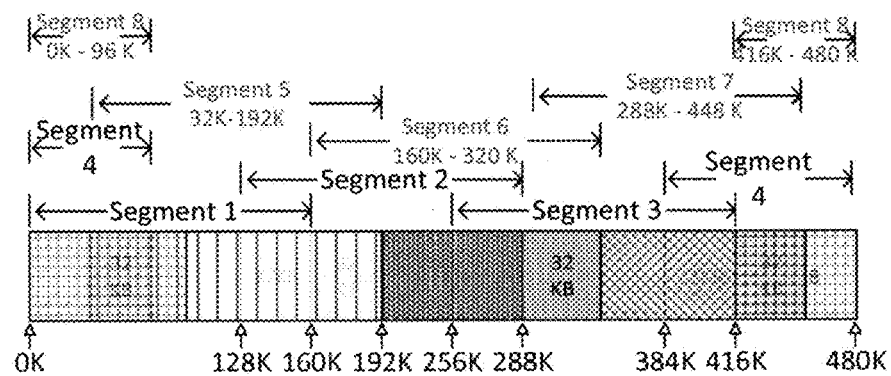

An exemplary circular addressing method accordingly to one embodiment of the invention is illustrated in FIG. 2. The length of a circular buffer, i.e. the range of circular addressing, can be predefined, for example, as equal to the full length of the SRAM. Alternatively, the length of a circular buffer can be predefined to be only a portion of the SRAM. After the data is sliced into a number of segments and when the next data segment to be cached exceeds the range of circular addressing, the oversize portion will be redirected to a new address in a predefined manner. For example, as shown in FIG. 2(*a*), one exemplary range of circular addressing is set as 0 KB to 480 KB—the full length of the illustrated SRAM. A full set of data of 544 KB is also divided into four consecutive segments of 160 KB each (with 32 KB overlapping between successive segments). The fourth data segment if cached consecutively would range from 384 KB to 544 KB, including the overlapping boundary data between 384 KB to 416 KB, thus exceeding the circular addressing range—0-480 KB—by 64 KB. To avoid duplicative loading of the overlapping boundary data between segments 3 and 4, the first portion of the fourth segment, from 416 KB to 480 KB will be cached continuously following segment 3 but the second portion—the oversize 64 KB is redirected to another address, for example starting from the beginning of the circular addressing range, i.e. 0 KB, and cached as 0-64 KB, as shown in FIGS. 2(*a*) and 2(*b*). The next segments of data will be continuously cached in the SARM—segment 5 cached to 32 KB to 192 KB, segment 6 cached to 160 KB to 320 KB, and segment 7 ached to 288 KB to 448 KB as shown in FIG. 2(*b*). Because caching the entire segment 8 (would address to 416 KB-576 KB) would exceed the capacity of SRAM, segment 8 is divided into two portions. The first portion is cached to 416 KB to 480 KB as shown in FIG. 2(*b*) and the oversize portion likewise is redirected to the beginning of the circular range and is cached to 0 KB to 96 KB as shown in FIG. 2(*c*). The next data segments will be processed in the same way and the oversize portions exceeding the size of SRAM in the segments will be redirected to the beginning of the circular range. Note, the oversize portion can also be redirected to any pre-defined address within the range of the circular addressing, not necessarily from the beginning of the range. The divided portions of the data of the same segment can be subsequently fetched from respective addresses and are processed together as parts of the same segment of data. Through redirecting the oversize portion of a data segment to a predefined address using circular addressing, the duplicative caching of boundary data is avoided.

Figure 3:
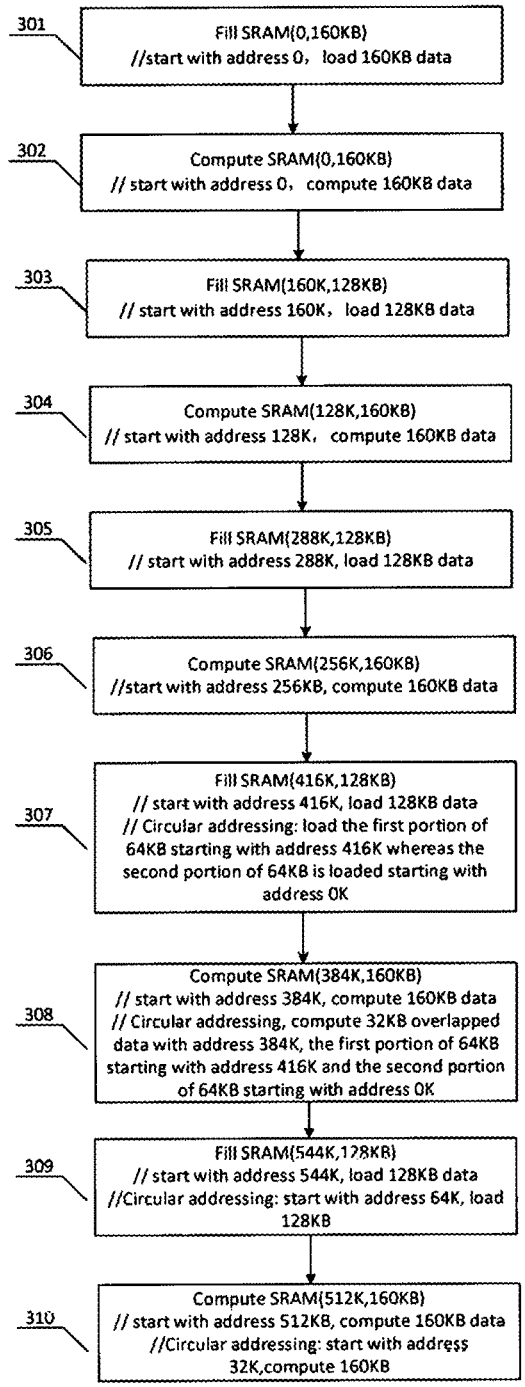
FIG. 3 is a flowchart illustrating an embodiment of the present invention using exemplary circular buffer instructions to cache and address the four segments of 544 KB data in a 480 KB SRAM.

FIG. 3 is flowchart illustrating the exemplary circular addressing instructions and the underlying processes according to one embodiment of the invention. The length of a circular buffer, i.e. the range of circular addressing is predefined as the full length of the exemplary SRAM-480 KB. Also, an exemplary set of 544 KB is divided into four consecutive segments of 160 KB each (with 32 KB overlapping between neighboring segments).

At step 301, the instruction is Fill SRAM (0, 160 KB). Under this instruction, starting with the address 0—the beginning of the SRAM, the first segment of 160 KB data is loaded into the SRAM ranging from address 0 KB to address 160 KB. At step 302, the instruction is Compute SRAM (0 160 KB). The system is instructed to compute 160 KB data, starting at the address 0 KB. At step 303, the instruction is Fill SRAM (160K, 128 KB), which means starting at the address 160 KB, loading 128 KB data into the SRAM, thus having the second segment of 160 KB data cached between address 128 KB and address 288 KB including the 32 KB boundary data between address 128 KB and address 160 KB that overlaps with the first segment. At step 304, the instruction is Compute SRAM (128K, 160 KB), which means computing 160 KB data starting at address 128 KB, i.e. the second segment of data ranging from address 128 KB to address 288 KB. At step 305, the instruction is Fill SRAM (288K, 128 KB). Under this instruction, the system is instructed to start at the address 288 KB and load 128 KB data into the SRAM, thus having the third segment of 160 KB data cached between address 256 KB and address 416 KB including the 32 KB boundary data between address 256 KB and address 288 KB that overlaps with the second segment. At step 306, the instruction is Compute SRAM (256K, 160 KB), which means computing the 160 KB data starting at address 256 KB, i.e. the third segment of data ranging from address 256 KB to address 416 KB.

At step 307, the instruction is Fill SRAM (416K, 128 KB). Under this instruction, starting at address 416 KB and loading 128 KB data into the SRAM would exceed the size of SRAM-480 KB. Instead of loading the entire fourth segment including the boundary data ranging from 384 KB to 416 KB to a new address, using circular addressing, the fourth data segment is divided into two portions, the first portion of 64 KB is loaded between address 416 KB and address 480 KB, and the second portion of 64 KB is loaded starting at address 0 KB. At step 308, the instruction is Computer SRAM (384K, 160K). Under this instruction, computing 160 KB data starting at address 384 KB can be performed by computing the boundary 32 KB data ranging from address 384 KB to 416 KB, the first portion of 64 KB ranging from address 416 KB to address 480 KB, the second portion of 64 KB ranging from address 0 to address 64 KB. At step 309, the instruction is Fill SRAM (544K, 128 KB). Under this instruction, filling 128 KB data starting at address 544 KB using circular addressing can be performed by loading 128 KB data into the SRAM at the start address of 64 KB-continuous from last address of the fourth segment, thus having the fifth segment of 160 KB data cached between address 32 KB and address 192 KB including the 32 KB boundary data between address 32 KB and address 64 KB that overlaps with the fourth segment. At step 310, the instruction is Compute SRAM (512K, 160 KB). Computing 160 KB data starting at address 512 KB using circular addressing under this instruction means computing 160 KB data starting at address 32 KB, i.e. the fifth segment of data ranging from address 32 KB to address 192 KB.

The subsequent segments can be cached and computed in the same way: the segment will be loaded into the SRAM following the last segment when there is enough storage in the SRAM to cache the entire segment; when loading the segment would exceed the size of SRAM, it will be divided into two portions-one portion will be cached to the remaining storage of the SRAM and the other will be redirected to the beginning of the SRAM.

Figure 4:
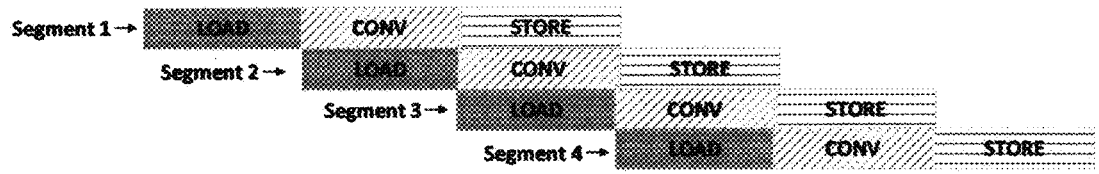
FIG. 4 is a diagram illustrating parallel processing of different data segments in accordance with an embodiment the present invention.

While loading and computation of the next segment of data can occur after completion of processing of the last segment as shown in FIG. 3, in another embodiment, the processing of different segments can happen in parallel but at staggered stages. For example, as shown in FIG. 4, segment 2 can be loaded into SRAM while the data of segment 1 has already been cached and is being computed using convolutional operations. When the output of convolutional operation of segment 1 is being stored, segment 2 is being computed and segment 3 is being loaded into SRAM. When segment 4 is loaded into the SRAM using circular addressing with one portion redirected to the address range previously used by segment 1 thus overriding the data of segment 1, segment 1 has already been proceed with output stored. Parallel processing of different data segments in stages increases the utility and efficiency of the SRAM while ensuring that the circular addressing would not override data of previous segments that has not been fully processed.

Figure 5:
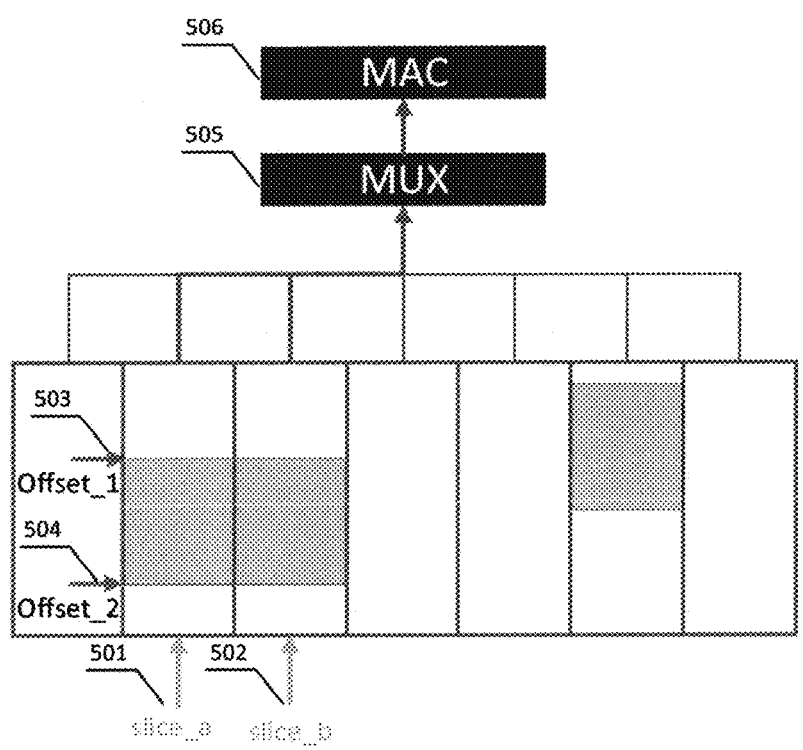
FIG. 5 is a simplified block diagram illustrating using circular addressing in a two-dimension SRAM in accordance with an embodiment the present invention.

The circular addressing principle according to aforementioned embodiments of the present invention is illustrated using one-dimension (1-D) memory for simplification. The circular addressing principle can also be applied to a two-dimension (2-D) memory using hardware extension in another embodiment. As shown in FIG. 5, a 2-D memory can be indexed, addressed and accessed using the slice number (e.g., slice_a (501), slice_b (502)) in one dimension (width) and the offset number (e.g., offset_1(503), offset_2 (504)) in the second dimension (depth). The range of the circular addressing can be predefined to include the SRAM memory space between offset_1 and offset_2 in slice_a and slice_b, as shown in the blue boxes in FIG. 5. After segmentation of the input data, data segments can be loaded into slice_a starting at offset_1 in depth and continue to fill in the space between offset_1 and 2 of slice_a. When loading the next segment into slice_a would go over the boundary of offeset_2 of slice_a, this segment will be divided into two portions where the first portion fills up to offset_2 of slice_a and the excess portion will be directed to slice_b starting at offset_1. Similarly, data segments will be continueously loaded into slice_b between offset_1 and offset_2. When loading the next segment into slice_b would go over the boundary of offeset_2 of slice_b, this segment will be divided into two portions where the first portion fills up to offset_2 of slice_b while the oversize portion will be directed to slice_a starting at offset_1. The subsequent data segments will be cached in the same manner between offset_1 and offset_2 of slice_a and slice_b.

Calculating the address for the next data segment to perform circular addressing using hardware modules according to an embodiment of the invention is further discussed below. Assuming the range of circular addressing is predefined to include the memory space between offset_1 (503) and 2 (504) of slice_a (501) and b (502). In the depth dimension, the start address is defined as offset_1 and the available depth for circular addressing is defined as (offset_2−offset_+1). In the width dimension, the start address is defined as slice_a and the available width for circular addressing is defined as (slice_b−slice_a+1). Assuming the current address is (offset_i, slice_j) and the length of data segment to be loaded is L, the new depth address offset_i' can be calculated as offset 1+(offset_i−offset_1+L) % (off-set_2−offset_1+1). The new width address slice_j' can be calculated as slice_a+(slice_i−slice_a+(offset_i−offset_+L)/(offset_2−offset_1+1))% (slice_b−slice_a+1).

Figure 8:
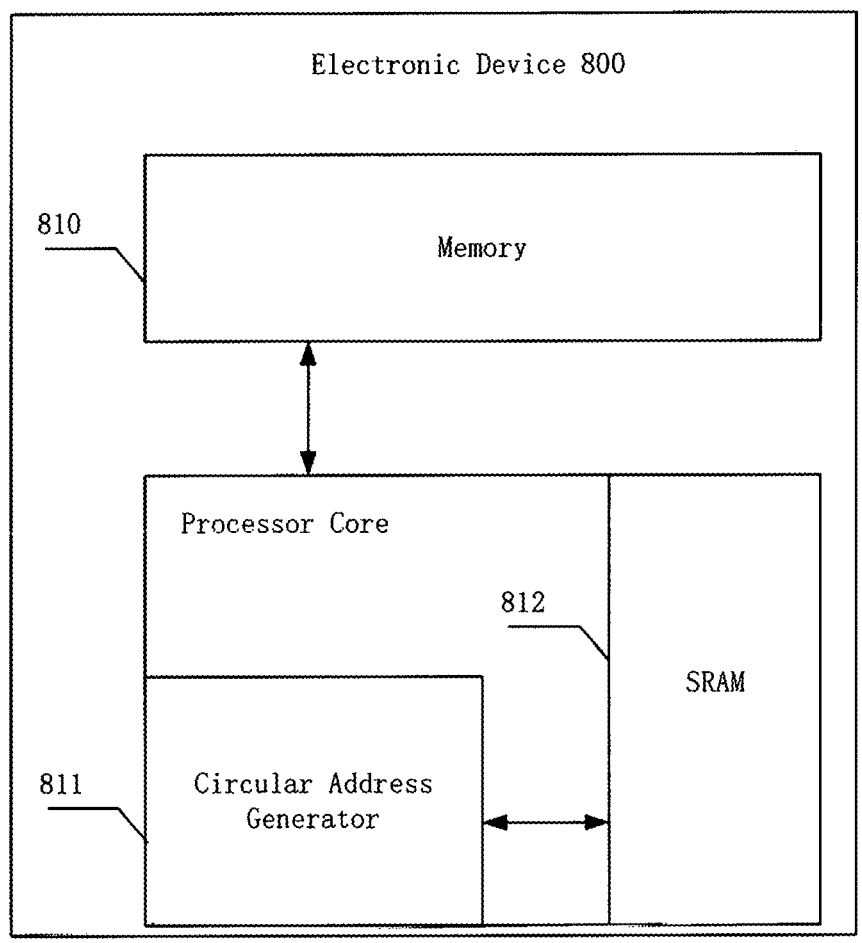
FIG. 8 is a simplified block diagram illustrating exemplary hardware modules that performs circular addressing according to one embodiment of the present principles can be applied.

These calculations and additional circular addressing instructions can be provided through hardware modules including for example an address generator. A simplified diagram of an integrated circuit processor, which includes the address generator according to an embodiment of the present invention, is provided in FIG. 8. An integrated circuit device 810 includes a program memory 811, a data memory 814 (such as a SRAM), and a processor core 812 that includes a circular address generator 815 for data memory addressing and access, a register file 813 including circular buffer program registers. The integrated circuit device 810 can also include additional logic components such as instruction decoder (not shown). The circular address generator 815 provides management for circular buffers in data memory 814 and calculates addresses for the data segments to be cached in the data memory as discussed above. The processor 812 executes instructions from the program memory 811, which include circular addressing instructions. Exemplary circular addressing instructions are shown in FIG. 3 and discussed above. The circular address instructions rely on the circular buffer program registers in the register file 813.

After the data segments are cached in slice_a or slice_b using circular addressing as discussed above, the data segments can be transferred to and multiplexed in the MUX module (505) and then processed in the MAC array (506) for convolutional operations (or any other model-based multiplication and summarization operations) as also shown in FIG. 5.

Figure 6:
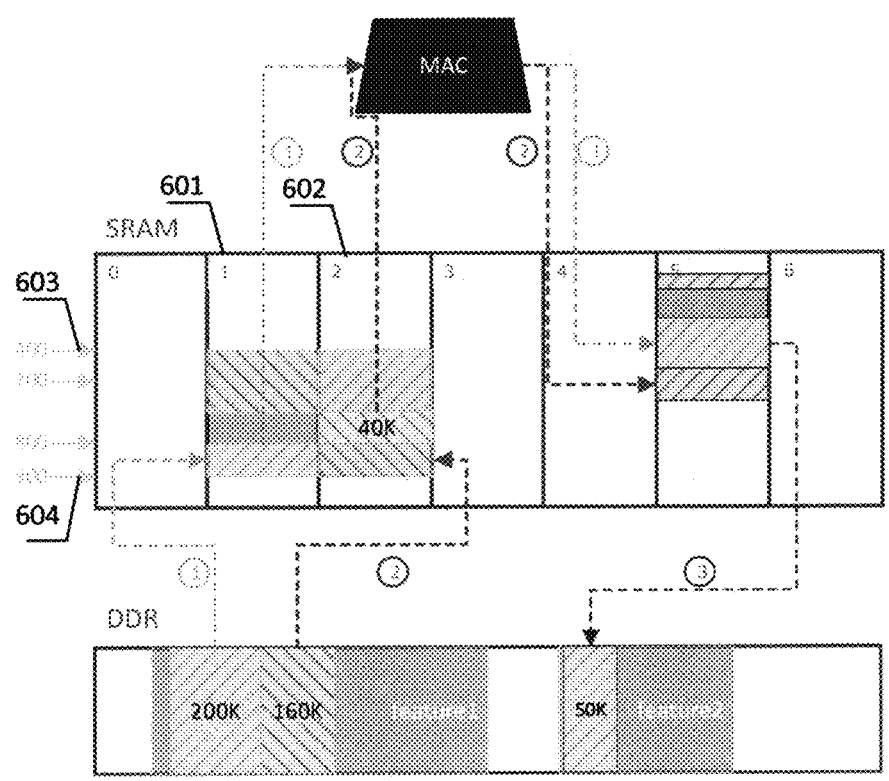
FIG. 6 is a simplified block diagram illustrating using circular addressing to cache and compute two 200 KB input data segments in a two-dimension SRAM in accordance with an embodiment the present invention.

Illustrated in FIG. 6 is another example of performing circular addressing in a 2-D SRAM according to one embodiment of the invention. The SRAM contains 7 slices (slice_0-slice_6) and each slice has a depth ranging from offset_0 to offset_1000. The range for circular address in the SRAM can be selected based on different considerations, including for example the distribution and utility of various portions of the SRAM. Different ranges can be selected for different input features, data types. Here, the range of circular addressing contains only a portion of the SRAM for data storage and processing, including slice_1 (601) and slice_2 (602) from offset_400 (603) to offset_900 (604).

In FIG. 6, 40 KB data can be cached between two successive offset boundaries in each slice, for example between offset_400 and offset_500 in slice_1 and between offset_800 and offset_900 in slice_2. Thus, slice_1 and slice_2 each can buffer 200 KB data in offset_400 to offset_900 range. The entire available SRAM for circular addressing thus can cache a total of 400 KB data. Assuming each input feature has a size of 640×640×32 (12 MB) and the output feature from convolutional operations has a size of 320×320×32 (3 MB), the entire input feature of 12 MB cannot be cached into the 400 KB range at once. Thus, the input feature need to be divided into segments, for example, into segments each having a size of 10×640×32 (200 KB).

Assuming the convolutional kernel used in this embodiment has a size of 5×5 with stride 2 (kernels of other sizes can also be used), applying the convolutional kernel to the segments of the input feature would result in 2×640×32 (40 KB) boundary overlapping data in computing the neighboring segments. Using circular addressing, only 160 KB non-overlapping data of the next segment need to be loaded following the overlapping 40 KB boundary data of the last segment. If loading the next segment exceeds the predefined SRAM range for circular addressing, e.g., defined by (slice_id, offset_id), circular addressing is applied to redirect the excess data in that segment to another location within the circular address range.

In this example in FIG. 6, the first input feature of 12 MB stored in off-chip memory (e.g., DDR memory) is divided into multiple 200 KB segments. To perform convolutional operations on the first input feature, the 200 KB data of the first segment is first loaded into the circular addressing range staring from address SRAM (1, 800)—i.e. slice_1 and offset_800. It reaches up to SRAM (1, 900) after loading 40 KB data. The remaining 160 KB data of the first segment is redirected to slice_2 starting at SRAM (2, 400) and continue to fill slice_2 up to SRAM (2, 800). The first segment cached in the SRAM—the first portion cached from SRAM (1, 800) to (1, 899) and the second portion cached from SRAM (2, 400) to (2, 799)—is then processed in the MAC array to perform convolutional operations. The output data of 50 KB is buffered into a pre-defined range/address of the SRAM (for example, slice_5, offset_350 to 500 in FIG. 6) and then subsequently stored into the off-chip memory (e.g., DDR). Next, the non-overlapping 160 KB data of the second segment of the first input feature is loaded into the SRAM starting at SRAM (2, 800) following the first segment. Again, after loading 40 KB out of the 160 KB data, it reaches the lower boundary of the circular address range, SRAM (2, 900). The remaining 120 KB data is then redirected to SRAM (1, 400) and continue to cache up to SRAM (1, 700). The second segment cached in the SRAM—the first portion of overlapping 40 KB data cached between SRAM (2, 700) to (2, 799), the second portion of 40 KB data cached from SRAM (2, 800) to (2, 899), and the third portion of 120 KB cached from SRAM (1, 400) to (1, 699)—is then processed in the MAC array to perform convolutional operations. The 50 KB output data is similarly stored into SRAM in a predefined address for example slice_5 before storing them to the off-chip memory.

Figure 7:
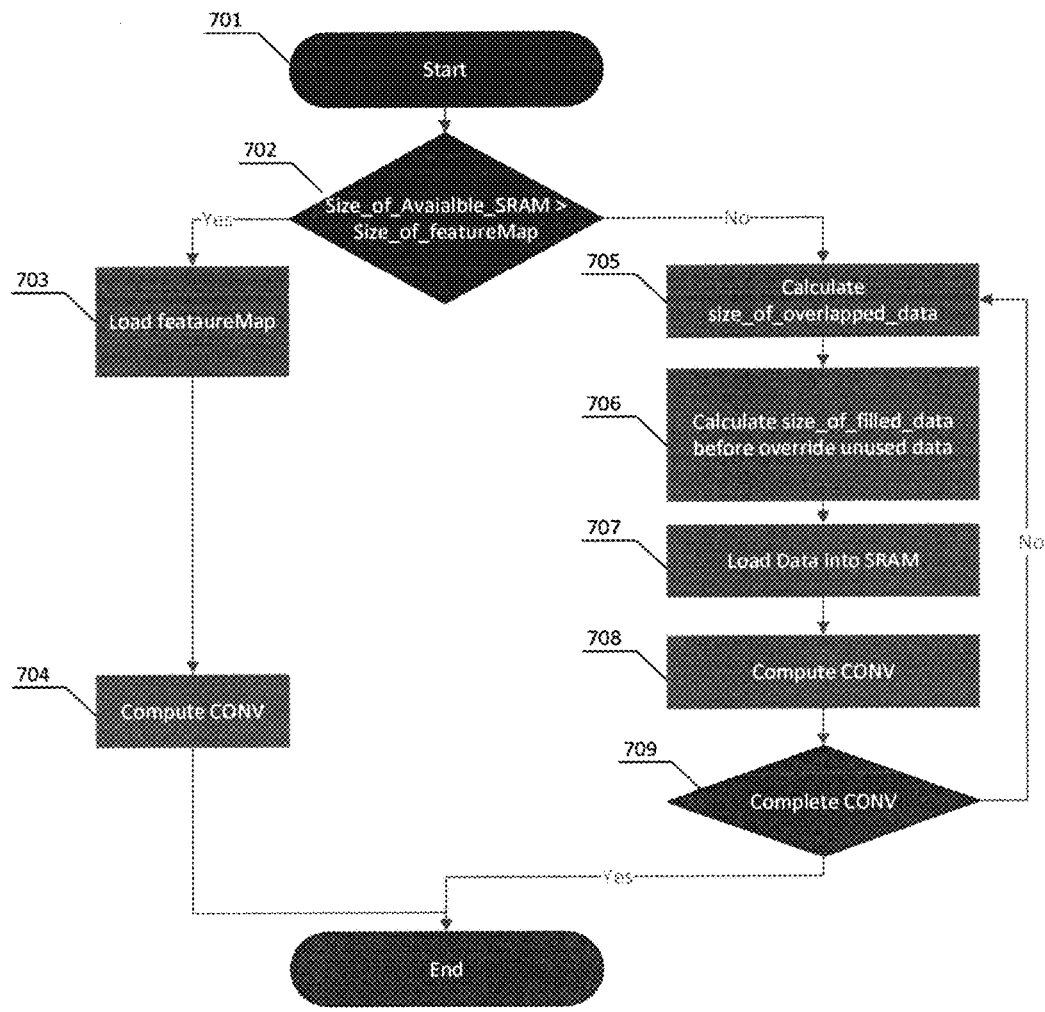
FIG. 7 is a flowchart illustrating providing additional circular addressing instructions using software modules according to one embodiment of the invention.

In another embodiment of the present invention, software modules, for example a complier extension, can be used to provide additional circular addressing instructions in addition to the circular addressing instructions provided through hardware modules as discussed above. These additional software instructions enable caching segments of data continuously in virtually unlimited memory space despite the limited physical size of the SRAM and computing the cached segments, such as performing convolutional operations. FIG. 7 illustrates an exemplary flow chart of these additional circular addressing instructions provided through software modules.

The software-based instructions to process each data segment start at step 701. At step 702, it determines whether the size of remaining available SRAM for caching the input data segment is equal or bigger than the size of non-overlapping data of the input data segment. If the determination is yes, it goes to step 703 to load the non-overlapping data of the t input segment into the SRAM. At step 704, convolutional operations are performed on the cached non-overlapping and overlapping data of the segment. After the completion of the convolutional operations, the processing of this segment ends. On the other hand, if the size of remaining available SRAM for caching the input data segment is determined as not equal or bigger than the size of non-overlapping data of the input data segment at step 702, the instructions proceed to step 705 to calculate the size of the overlapping data. At step 706, calculation is performed to determine the size of remaining available SRAM before overriding unused data. At step 707, the same size of non-overlapping data of the segment that is equal to the remaining size of the available SRAM is loaded into the SRAM and the excess non-overlapping data of the segment is redirected to another predefined address using circular addressing as discussed above. At step 708, convolutional operations are performed on the overlapping data, the portion of non-overlapping data of the segment fitting into the remaining SRAM size, and the portion of non-overlapping data of the segment cached in a redirected address. At step 709, it checks whether the entire data segment has been proceeded. If not, it goes back to step 705 to cache and compute the remaining data in the data segment before it proceeds to the end.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for performing circular addressing, comprising:
   a. defining a circular addressing region in a memory system, wherein the circular addressing region has an upper boundary with an address $A_x$ and a lower boundary with an address $A_y$;
   b. dividing a data sample into more than one consecutive data segments, wherein more than one consecutive data segments include segments $D_0$ to $D_n$, wherein n is equal to or greater than 1;
   c. providing an instruction set for execution, wherein the instruction set is configured to compute an address $A_i$, wherein the data segment $D_i$ is stored in the circular address region starting from the address $A_i$, wherein the data segment $D_i$ has a length of L comprising a first portion with a length of $L_1$ and a second portion with a length $L_2$, wherein the first portion of the data segment $D_i$ overlaps with data segment $D_{i-1}$, wherein i is greater than 0, and is less than or is equal to n;
   d. executing the instruction set to compute the address $A_i$ based on an address $A_{i-1}$, wherein data segment $D_{i-1}$ is stored in the circular address region starting from the address $A_{i-1}$; wherein the address $A_i$ is computed as $A_x+(A_{i-1}-A_x+L_2) \% (A_y-A_x+1)$; wherein % indicates a modulo operation that finds the remainder after division of $(A_{i-1}-A_x+L_2)$ by $(A_y-A_x+1)$; and
   e. storing the data segment $D_i$ starting at the address $A_i$.

2. A method for performing circular addressing, comprising
   a. defining a circular addressing region in a memory system, wherein the circular addressing region has a width and a depth, wherein the width of circular addressing region is divided into one or more slices including $Slice_a$ to $Slice_b$ and the available width of the circular addressing region is defined as $(Slice_a - Slice_b + 1)$; wherein the depth of circular addressing region has an upper boundary with an address of $Offset_x$ and a lower boundary with an address of Offset$_{-y}$, and the available depth of the circular addressing region is defined as (Offset$_{-y}$−Offset$_{-x}$+1);

b. dividing a data sample into more than one consecutive data segments, wherein more than one consecutive data segments include segments D$_0$ to D$_n$, wherein n is equal to or greater than 0;

c. providing an instruction set for execution, wherein the instruction set is configured to compute (Slice$_{-i}$, Offset$_{-j}$) for data segment D$_i$, wherein the data segment D$_i$ is stored in in Slice$_{-i}$ starting from the address Offset$_{-j}$ in the circular addressing region, wherein the data segment D$_i$ has a length of L comprising a first portion with a length of L$_1$ and a second portion with a length L$_2$, wherein the first portion of the data segment D$_i$ overlaps with the data segment D$_{i-1}$, wherein i is equal or greater than 0, and is less than or is equal to n;

d. executing the instruction set to compute (Slice$_{-i}$, Offset$_{-j}$) for data segment D$_i$ based on (Slice$_{-i-1}$, Offset$_{-j-1}$), wherein data segment D$_{i-1}$ is stored in in Slice$_{-i-1}$ starting from the address Offset$_{-j-1}$ in the circular addressing region; wherein Offset$_{-j}$ is computed as Offset$_{-x}$+(Offset$_{-j-1}$−Offset$_{-x}$+L) % (Offset$_{-y}$−Offset$_{-x}$+1); wherein the address Slice$_{-i}$ is computed as Slice$_{-a}$+(Slice$_{-i-1}$−Slice$_{-a}$+(Offset$_{-i-1}$−Offset$_{-x}$+L)/(Offset$_{-y}$−Offset$_{-x}$+1))% (Slice$_{-b}$−Slice$_{-a}$+1); wherein % indicates a modulo operation that finds the remainder after division of one by another; and e. storing the data segment D$_i$ in Slice$_{-i}$ in width, starting at the Offset$_{-i}$ in depth.

3. The method of claim 2, further comprising transferring and multiplexing data segment D$_i$.

4. The method of claim 2, further comprises performing a computation of the data segment D$_i$.

5. The method of claim 4, wherein the computation comprises a convolutional operation.

6. The method of claim 5, wherein the method is performed in a deep learning application.

7. The method of claim 2, wherein the memory system comprises a memory within an embedded device.

8. The method of claim 2, wherein the memory system comprises an SDRAM.

9. The method of claim 8, wherein the SDRAM comprises more than one circular addressing region.

10. The method of claim 2, wherein the instruction set is provided using one or more software modules.

11. The method of claim 2, wherein the method is performed using one or more hardware modules.

12. An apparatus for performing circular addressing, comprising, a. an integrated circuit device, wherein the integrated circuit comprising a data memory and a processor core;
   i. wherein the processor core further comprising a circular address generator;
   ii. wherein the circular address generator is configured to perform data memory addressing and access in said data memory;
   iii. Wherein said data memory including one or more circular addressing region having a width and a depth, wherein the width of one circular addressing region is divided into one or more slices including Slice$_{-a}$ to Slice$_{-b}$, and the available width of said circular addressing region is defined as (Slice$_{-a}$−Slice$_{-b}$+1), wherein n is equal to or greater than 0; wherein the depth of said circular addressing region has an upper boundary with an address as Offset$_{-x}$ and a lower boundary with an address as Offset$_{-y}$, and the available depth of the circular addressing region is defined as (Offset$_{-y}$−Offset$_{-x}$+1);
   iv. wherein the circular address generator is configured to execute an instruction set to compute (Slice$_{-i}$, Offset$_{-j}$) for a data segment D$_i$ with a length of L, wherein the data segment D$_i$ is comprised in more than one consecutive data segments including segments D$_0$ to D$_n$, wherein n is equal to or greater than 0 and wherein i is equal or greater than 0, and is less than or is equal to n; wherein the data segment D$_i$ is stored in Slice$_{-i}$ starting from the address Offset$_{-j}$ in said circular addressing region;
   v. wherein the circular address generator is configured to compute (Slice$_{-i}$, Offset_j) for data segment D$_i$ based on (Slice$_{-i}$−, Offset$_{-j-1}$), wherein data segment D$_{i-1}$ is stored in in Slice$_{-i-1}$ starting from the address Offset$_{-j-1}$ in the circular addressing region; wherein Offset$_{-j}$ is computed as Offset$_{-x}$+(Offset$_{-i-1}$−Offset$_{-x}$+L) % (Offset$_{-y}$−Offset$_{-x}$+1); wherein the address Slice$_{-i}$ is computed as Slice$_{-a}$+(Slice$_{-i-1}$−Slice$_{-a}$+(Offset$_{-i-1}$−Offset$_{-x}$+L)/(Offset$_{-y}$−Offset$_{-x}$+1))% (Slice$_{-b}$−Slice$_{-a}$+1); wherein % indicates a modulo operation that finds the remainder after division of one by another; and
   vi. wherein processor core is further configured to store data segment D$_i$ in Slice$_{-i}$ in the circular addressing region, starting at the Offset$_{-i}$ in depth.

13. An apparatus of claim 12, wherein said data memory comprises an SDRAM.

14. An apparatus of claim 12, wherein said integrated circuit device further comprising a register file, wherein the register file including circular buffer program registers.

15. An apparatus of claim 12, wherein said processor core is further configured to transfer the data segment D$_i$ for multiplexing.

16. An apparatus of claim 12, wherein said processor core is further configured to perform a computation of the data segment D$_i$.

17. An apparatus of claim 16, wherein the computation comprises a convolutional operation.

18. An apparatus of claim 16, wherein the apparatus further comprises another memory outside the integrated circuit device, wherein said memory is configured to store output from the computation of the data segment D$_i$.

19. An apparatus of claim 16, wherein the computation is performed in a deep learning application.

20. An apparatus of claim 12, wherein the apparatus is a mobile handheld device.

* * * * *